United States Patent
Chen et al.

(10) Patent No.: US 7,826,347 B2
(45) Date of Patent: Nov. 2, 2010

(54) CALL PROCESSING DEVICE AND METHOD

(75) Inventors: Ching-Hao Chen, Taipei Hsien (TW); Wen-Yuan Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 78 days.

(21) Appl. No.: 12/411,408

(22) Filed: Mar. 26, 2009

(65) Prior Publication Data
US 2009/0304163 A1 Dec. 10, 2009

(30) Foreign Application Priority Data
Jun. 5, 2008 (CN) .................... 2008 1 0302039

(51) Int. Cl.
*G01R 31/08* (2006.01)
*H04L 12/56* (2006.01)

(52) U.S. Cl. .............. 370/216; 370/419; 379/93.09; 379/93.05; 379/156

(58) Field of Classification Search ......... 370/216–221, 370/419; 379/156, 164, 166, 242, 245–246, 379/333–337
See application file for complete search history.

(56) References Cited

U.S. PATENT DOCUMENTS

| | | | |
|---|---|---|---|
| 7,072,584 B1 * | 7/2006 | Lichtman et al. ............. 398/59 |
| 7,492,705 B1 * | 2/2009 | Toman et al. ............... 370/217 |
| 7,720,048 B2 * | 5/2010 | Pulkka ....................... 370/352 |
| 2002/0018442 A1 | 2/2002 | Okada | |
| 2003/0002505 A1 * | 1/2003 | Hoch et al. ................. 370/392 |
| 2003/0043985 A1 * | 3/2003 | Wu ....................... 379/144.05 |
| 2005/0089331 A1 * | 4/2005 | Margalit .................... 398/139 |
| 2007/0291794 A1 * | 12/2007 | Jiang et al. .................. 370/493 |
| 2008/0254805 A1 * | 10/2008 | Gu ............................. 455/445 |

\* cited by examiner

*Primary Examiner*—Ayaz R Sheikh
*Assistant Examiner*—Mounir Moutaouakil
(74) *Attorney, Agent, or Firm*—Frank R. Niranjan

(57) ABSTRACT

A call processing device communicating with a plurality of line cards includes a mapping table and an address table. The call processing device receives a telephone number, searches the mapping table for one index related to the received telephone number, searches the address table for one address corresponding to the sought index, rejects a call corresponding to the received telephone number if the sought address is a specially preset address, and updates one or more of the addresses of the line cards in the address table if operating modes of one or more of the line cards are changed. A call processing method is also provided.

20 Claims, 3 Drawing Sheets

CALL PROCESSING DEVICE AND METHOD

BACKGROUND

1. Technical Field

Embodiments of the present disclosure relate to network devices, and more particularly to a call processing device and method.

2. Description of Related Art

With voice over Internet protocol (VoIP), telephones must connect to the Internet protocol (IP) network through network access devices by way of line cards in the network access devices. The network access devices support both voice and data and often use a data table to match telephone numbers with port numbers of line cards in the network access devices to process calls. The line cards can be preset to operate in different modes, such as standalone, active, and backup modes. Currently, operating modes of the line cards are normally preconfigured and cannot be changed after this initial configuration. Accordingly, if the need arises to upgrade the line cards must be replaced and this increases cost and is also an inconvenience.

Therefore, a heretofore unaddressed need exists for network access devices that can overcome the limitations described.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

Figure 1:
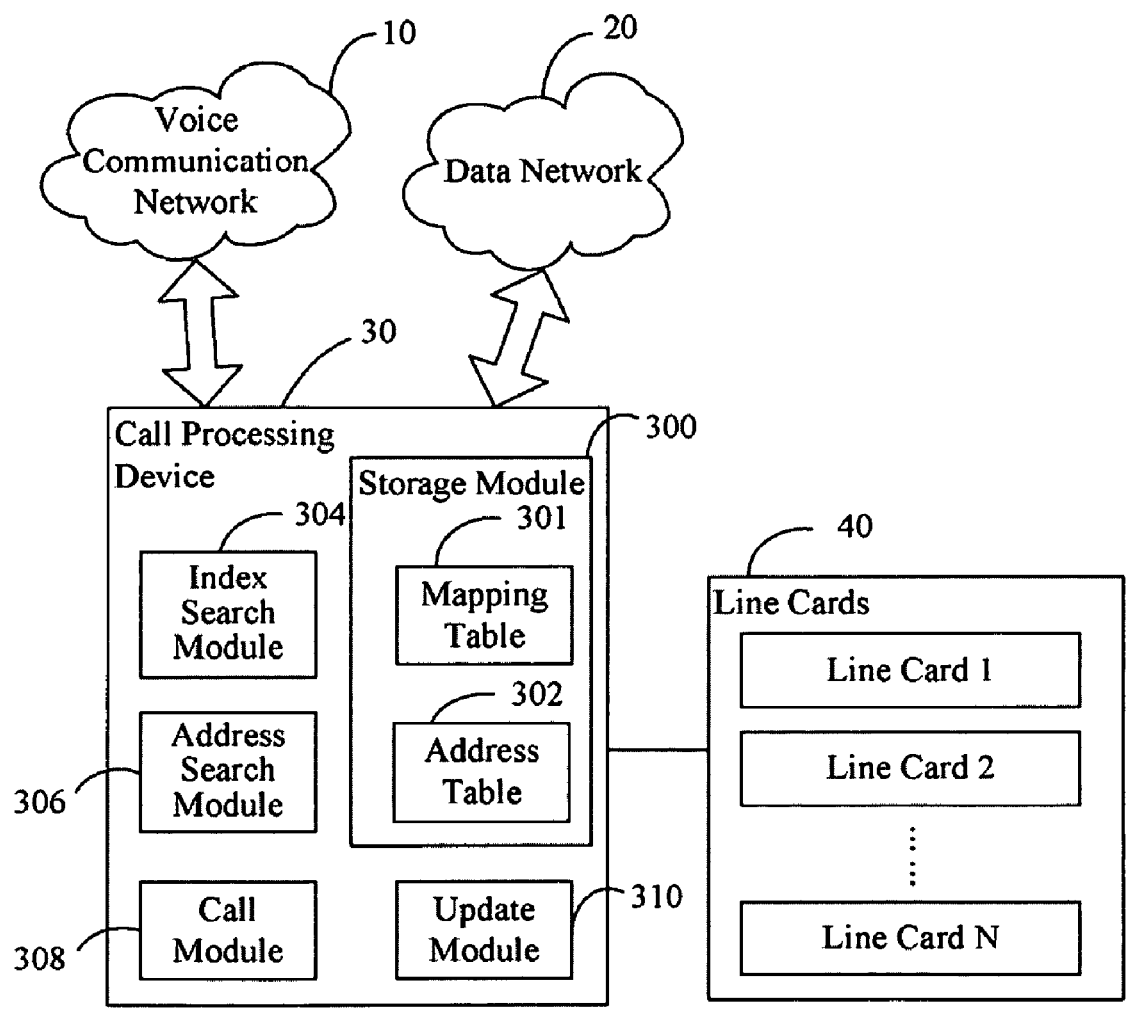
FIG. 1 is a schematic diagram of an application environment and functional modules of a call processing device of the present disclosure.

FIG. 1 is a schematic diagram of an application environment and functional modules of a call processing device 30 of the present disclosure. The call processing device 30 communicates with a voice communication network 10, a data network 20, and a plurality of line cards 40, for processing calls from the voice communication network 10 via the plurality of line cards 40. The voice communication network 10 includes a plurality of telephone lines. Calls over the plurality of telephone lines correspond one-to-one with a plurality of telephone numbers. The call processing device 30 gets a telephone number from the voice communication network 10 when there is a call over one of the plurality of telephone lines. Each line card 40 includes a plurality of ports. Each call corresponding to each telephone number is processed via one port of one line card 40. Relationship between the telephone numbers and the ports of the line cards 40 is preset.

The call processing device 30 receives the telephone numbers emanating from calls coming from the plurality of the telephone lines of the voice communication network 10. The call processing device 30 then acquires media access control (MAC) addresses and port numbers from line cards 40 and relates them to the corresponding telephone numbers. The line cards 40 routes the telephone calls to the data network 20. Alternatively, the telephone numbers may be replaced with Internet protocol (IP) layer 3 addresses corresponding one-to-one with the telephone numbers.

The call processing device 30 may be, for example, a large-scale network access gateway in a central office. The voice communication network 10 is a network that transfers signals, such as a public switch telephone network (PSTN). The data network 20 is a network that transfers data, such as Internet or an Ethernet network.

Here, one line card 40 may operate in different modes, such as standalone mode, active mode or backup mode. Each line card operating in backup mode is a redundant or fault tolerant line card for at least one line card in active mode. The line card in active mode executes a task and the line card operating in backup mode is on standby. If the line card in active mode becomes dysfunctional, the line card operating in backup mode takes over and executes the communication task in place of the line card in active mode. The operating mode of the line cards 40 can be changed.

The call processing device 30 includes a storage module 300, an index search module 304, an address search module 306, a call module 308, and an update module 310. The storage module 300 is configured for storing a mapping table 301 and an address table 302.

The mapping table 301 includes a plurality of telephone numbers, a plurality of indices of the line cards 40, and a plurality of port numbers respectively related to the plurality of telephone numbers. Here, the indices of the line cards 40 are a series of preset numbers, such as 1, 2, and 3. The indices of the line cards 40 correspond one-to-one with the line cards 40. For example, an index of a first line card can be preset as 1, that of a second line card 2, and so on. The port numbers are a series of preset numbers, such as 1, 2, and 3. The port numbers are configured for identifying the ports of each of the line cards 40. For example, a port number of a first port of one line card can be preset as 1, and that of a second port of the one line card as 2.

The address table 302 includes the plurality of indices and corresponding addresses of the line cards 40.

The call processing device 30 locates each line card 40 by its MAC address. Here, the addresses in the address table 302 corresponding to the line cards operating in standalone or active mode are set as the MAC addresses of the line cards. The addresses in the address table 302 corresponding to the line cards operating in backup mode are all specially preset to indicate nonexistence of the line cards 40. Here, the specially preset address is 00:00:00:00:00:00. That is, the call processing device 30 considers that a line card 40 does not exist if the address of the line card 40 is 00:00:00:00:00:00.

The index search module 304 is configured for receiving a telephone number from the voice communication network 10 and searching the mapping table 301 for one of the indices and one of the port numbers corresponding to the telephone number.

The address search module 306 is configured for searching the address table 302 for one address corresponding to the index sought by the index search module 304.

The call module 308 is configured for processing a call corresponding to the telephone number by way of a line card 40 corresponding to the address sought by the address search module 306 and a port corresponding to the port number sought by the index search module 304.

The call module 308 establishes the call corresponding to the telephone number according to the address sought by the address search module 306 and the port number sought by the index search module 304 if the address sought by the address search module 306 is not the specially preset address.

The call module 308 rejects the call corresponding to the telephone number if the address sought by the address search module 306 is the specially preset address. For example, if the address search module 306 determines that the acquired address corresponding to a telephone number is 00:00:00:00:00:00, the call module 308 determines that a line card 40 for processing the telephone number does not exist and then rejects the call corresponding to the telephone number. As such, processing a call corresponding to a line card in backup mode is avoided.

The update module 310 is configured for updating one or more addresses in the address table 302 if the operating mode of one or more line cards 40 is changed or one or more line cards operating in active mode become dysfunctional. Here, the operating mode of the line card 40 may be changed from backup mode to active mode or standalone mode, from active mode or standalone mode to backup mode, or changed between active mode and standalone mode.

The update module 310 needs not update one or more addresses in the address table 302 if the line card 40 changes from standalone mode to active mode. The update module 310 updates the addresses in the address table 302 if the line cards 40 changes from backup mode to active mode or standalone mode, or from active mode or standalone mode to backup mode.

For example, if the line card 40 changes from backup mode to standalone or active mode, the update module 310 updates the address in the address table 302 by way of changing the address of the line card 40 from the specially preset address to the MAC address of the line card. If line card 40 changes from standalone or active mode to backup mode, the update module 310 updates the address in the address table 302 by way of changing the address of the line card from the MAC address of the line card to the specially preset address.

If a line card 40 in active mode becomes dysfunctional, the update module 310 updates the address in the address table 302 by way of changing the address of the line card 40 from the MAC address of the line card 40 to the MAC address of another line card that backs up the line card 40. Here, if the update module 310 detects line card 40 becoming dysfunctional, it determines if the line card 40 is in active mode, and changes the address of the line card in active mode to the MAC address of another line card that backs up the line card in active mode.

Figure 2:
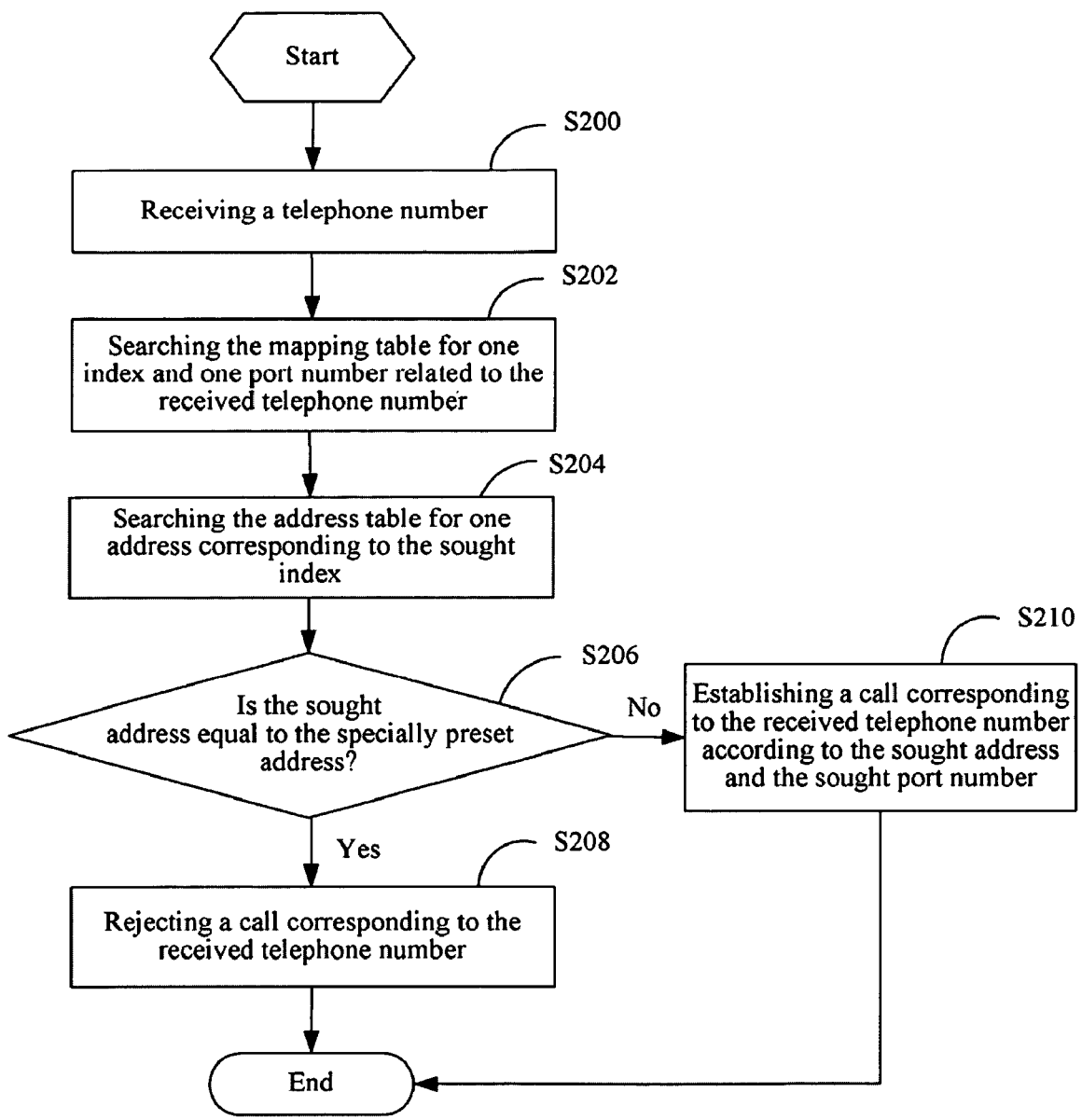
FIG. 2 is a flowchart of a call processing method in accordance with the present disclosure.

FIG. 2 is a flowchart of a call processing method in accordance with the present disclosure. Here, the call processing method is performed by the function modules depicted in FIG. 1. It may be understood that additional steps may be added, others may be removed, and ordering of the steps may be changed while remaining well within the scope of the disclosure. Here, the call processing method is configured for processing calls corresponding to telephone numbers. Alternatively, the telephone numbers may be replaced with layer 3 addresses corresponding one-to-one with the telephone numbers.

In step S200, the index search module 304 receives a telephone number from the voice communication network 10.

In step S202, the index search module 304 searches the mapping table 301 for one index and one port number corresponding to the telephone number.

In step S204, the address search module 306 searches the address table 302 for one address according to the index sought by the index search module 304.

In step S206, the call module 308 determines if the address sought by the address search module 306 is the specially preset address.

If the sought address is the specially preset address, then in step S208, the call module 308 rejects a call corresponding to the telephone number.

If the sought address is not the specially preset address, then in step S210, the call module 308 establishes the call corresponding to the telephone number according to the sought address and the sought port number.

Figure 3:
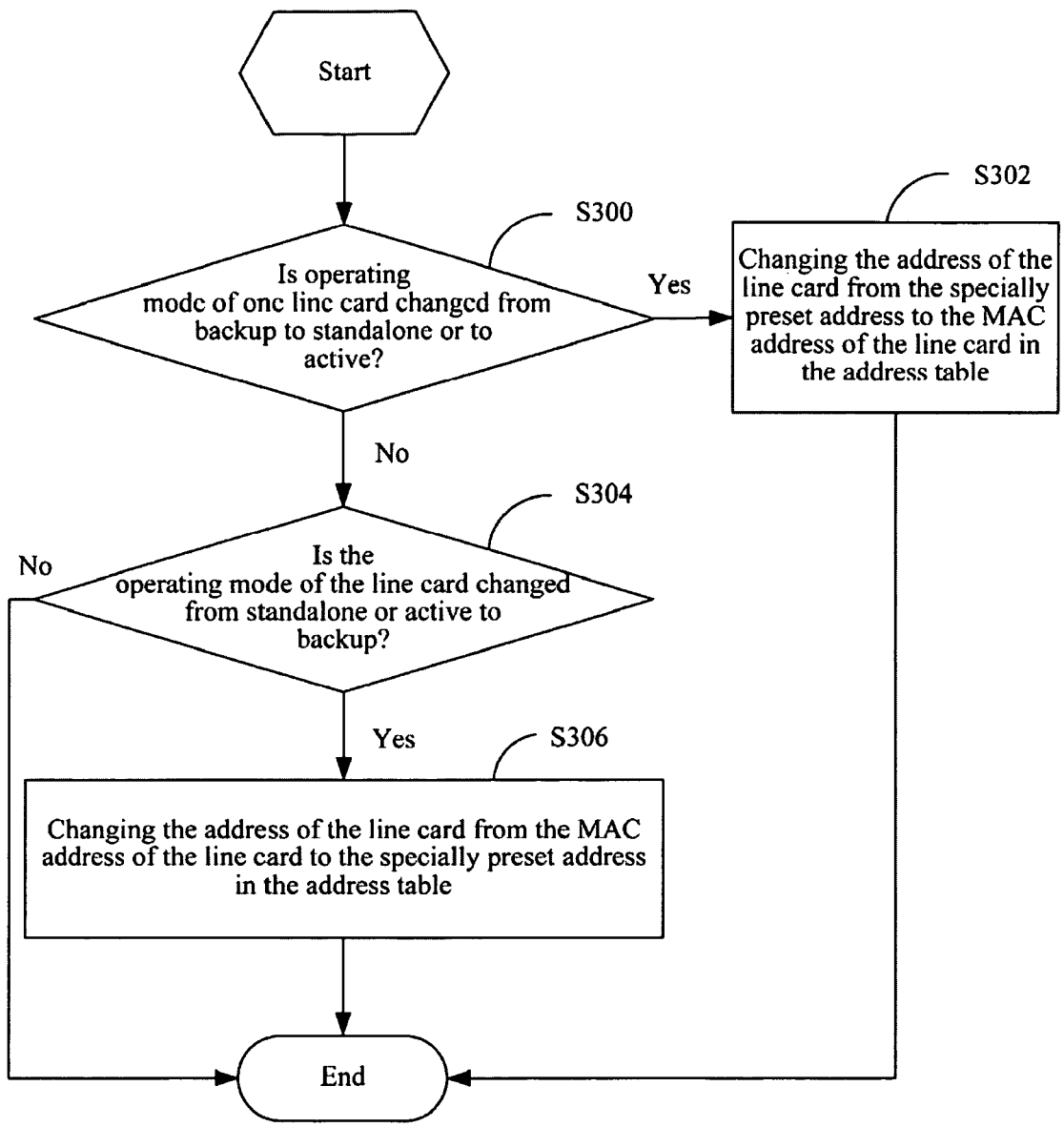
FIG. 3 is a flowchart of changing operating modes of line cards of the call processing device of FIG. 1 in accordance with the present disclosure.

FIG. 3 is a flowchart of the call processing device 30 of FIG. 1 changing operating modes of one or more of the line cards 40 in accordance with the present disclosure. Here, the operating mode of the line card 40 may be changed from backup mode to active mode or standalone mode, from active mode or standalone mode to backup mode, or between active mode and standalone mode.

When the update module 310 detects that the operating mode of the line card 40 has been changed, then in step S300, the update module 310 determines if the operating mode of the line card 40 is changed from backup mode to standalone or active mode.

If the operating mode of the line card 40 is changed from backup mode to standalone or active mode, then in step S302, the update module 310 changes the address relating to the index of the line card 40 from the specially preset address to the MAC address of the line card so as to update the address in the address table 302.

If the operating mode of the line card 40 is not changed from backup mode to standalone or active mode, then in step S304, the update module 310 determines if the operating mode of the line card 40 is changed from standalone or active mode to backup mode.

If the operating mode of the line card 40 is changed from standalone or active mode to backup mode, then in step S306, the update module 310 changes the address of the line card 40 from the MAC address of the line card 40 to the specially preset address so as to update the address in the address table 302.

If the operating mode of the line card 40 is not changed from standalone or active mode to backup mode, that is the operating mode of the line card 40 changes between standalone mode and active mode, then the update module 310 needs not update any address in the address table 302.

The call processing device 30 of the present disclosure specially presets the addresses of the line cards operating in backup mode, such that the line cards 40 can operate in different modes and the operating modes of the line cards 40 are changeable. In addition, after changing the operating mode of the line cards 40, not many telephone numbers and port numbers in the mapping table 301 need to be changed, only the addresses, in the address table 302, corresponding to the changed line cards need be changed, a significant improvement in terms of convenience and ease of update.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A call processing device communicating with a plurality of line cards, the call processing device comprising: a storage module configured for storing a mapping table and an address table, wherein the mapping table comprises a plurality of telephone numbers and a plurality of indices of the line cards respectively related to the plurality of telephone numbers, the address table comprises the plurality of indices and corresponding addresses of the line cards, and wherein the line cards operate in various modes comprising active mode, backup mode and standalone mode, with the address of the line cards operating in backup mode specially preset; an index search module configured for receiving a telephone number and searching the mapping table for one of the indices of the line cards related to the received telephone number; an address search module configured for searching the address table for one address of the line card corresponding to the index sought by the index search module; a call module configured for rejecting a call corresponding to the received telephone number if the acquired address is the specially preset address; and an update module configured for updating one or more of the addresses of the line cards in the address table if operating modes of one or more of the line cards are changed.

2. The call processing device as claimed in claim 1, wherein the specially preset address is 00:00:00:00:00:00.

3. The call processing device as claimed in claim 1, wherein each line card has a unique media access control (MAC) address.

4. The call processing device as claimed in claim 3, wherein the addresses of the line cards operating in active mode are respectively set as the MAC addresses thereof.

5. The call processing device as claimed in claim 4, wherein the addresses of the line cards operating in standalone mode are respectively set as the MAC addresses thereof.

6. The call processing device as claimed in claim 5, wherein the mapping table further comprises a plurality of port numbers respectively related to the plurality of telephone numbers, and the index search module is further configured for searching the mapping table for one of the port numbers corresponding to the received telephone number.

7. The call processing device as claimed in claim 6, wherein the call module is further configured for establishing the call corresponding to the received telephone number according to the acquired address and the acquired port number if the acquired address is not the specially preset address.

8. The call processing device as claimed in claim 7, wherein the update module updates the address table by way of changing the address of the line card operating in backup mode from the specially preset address to the MAC address of the line card if the operating mode of the line card is changed from backup to standalone or to active.

9. The call processing device as claimed in claim 7, wherein the update module updates the address table by way of changing the address of the line card operating in standalone mode or active mode from the MAC address of the line card to the specially preset address if the operating mode of the line card is changed from standalone or active to backup.

10. The call processing device as claimed in claim 7, wherein the update module is further configured for updating the address table to change the address of the line card in active mode from the MAC address of the line card to the MAC address of another line card that backs up the line card in active mode if the line card in active mode becomes dysfunctional.

11. A method for processing calls comprising: providing a plurality of line cards and ports; providing a mapping table comprising a plurality of telephone numbers and a plurality of indices of the line cards respectively related to the plurality of telephone numbers; providing an address table comprising the plurality of indices and corresponding addresses of the line cards, wherein the line cards operate in various modes comprising active mode, backup mode and standalone mode, and the address of the line cards operating in backup mode is specially preset; receiving a telephone number; searching the mapping table for one of the indices of the line cards related to the received telephone number; searching the address table for one address of the line card corresponding to the sought index; determining if the acquired address is the specially preset address; rejecting a call corresponding to the received telephone number if the acquired address is the specially preset address; and updating one or more of the addresses of the line cards in the address table if the operating modes of one or more of the line cards are changed.

12. The call processing method as claimed in claim 11, wherein the specially preset address is 00:00:00:00:00:00.

13. The call processing method as claimed in claim 11, wherein each line card has a unique media access control (MAC) address.

14. The call processing method as claimed in claim 13, wherein the addresses of the line cards operating in active mode are respectively set as the MAC addresses thereof.

15. The call processing method as claimed in claim 14, wherein the addresses of the line cards operating in standalone mode are respectively set as the MAC addresses thereof.

16. The call processing device as claimed in claim 15, wherein the mapping table further comprises a plurality of port numbers respectively related to the plurality of telephone numbers.

17. The call processing method as claimed in claim 16, further comprising:
searching the mapping table for one of the port numbers corresponding to the received telephone number; and
establishing a call corresponding to the received telephone number according to the acquired address and the acquired port number if the acquired address is not the specially preset address.

18. The call processing method as claimed in claim 17, further comprising:
determining if the operating mode of one of the line cards is changed from backup to standalone or to active; and
changing the address of the line card operating in backup mode in the address table from the specially preset address to the MAC address of the line card if the operating mode of the line card is changed from backup to standalone or to active.

19. The call processing method as claimed in claim 17, further comprising:
determining if the operating mode of one of the line cards is changed from standalone or active to backup; and
changing the address of the line card operating in standalone mode or active mode in the address table from the MAC address of the line card to the specially preset address if the operating mode of the line card is changed from standalone or active to backup.

20. The call processing method as claimed in claim 17, further comprising:
determining if the line card in active mode becomes dysfunctional; and
changing the address of the line card in active mode in the address table from the MAC address of the line card to the MAC address of another line card that backs up the line card in active mode if the line card in active mode becomes dysfunctional.

* * * * *